United States Patent [19]

Winter et al.

[11] Patent Number: 5,597,881
[45] Date of Patent: Jan. 28, 1997

[54] POLYOLEFIN MOLDING COMPOSITION FOR THE PRODUCTION OF MOLDING OF HIGH RIGIDITY AND TRANSPARENCY BY INJECTION MOLDING

[75] Inventors: Andreas Winter, Glashuetten; Horst Bormuth, Egelsbach; Bernd Bachmann, Eppstein, all of Germany

[73] Assignee: Hoechst Aktiengesellschaft, Frankfurt, Germany

[21] Appl. No.: 619,099

[22] Filed: Mar. 20, 1996

Related U.S. Application Data

[63] Continuation of Ser. No. 481,571, Jun. 7, 1995, abandoned, which is a continuation of Ser. No. 120,117, Sep. 10, 1993, abandoned.

[30] Foreign Application Priority Data

Sep. 11, 1992 [DE] Germany ............... 42 30 372.9

[51] Int. Cl.$^6$ ............... C08F 4/76; C08F 10/04; C08F 10/06; C08F 10/14
[52] U.S. Cl. ............... 526/348; 526/160; 526/308; 526/348.6; 526/351
[58] Field of Search ............... 526/308, 348, 526/348.6, 351, 160; 524/553, 570, 579, 582

[56] References Cited

U.S. PATENT DOCUMENTS

| | | | |
|---|---|---|---|
| 5,132,262 | 7/1992 | Rieger et al. | 502/117 |
| 5,132,381 | 7/1992 | Winter et al. | 526/160 |
| 5,145,819 | 9/1992 | Winter et al. | 502/117 |
| 5,239,022 | 8/1993 | Winter et al. | 526/127 |
| 5,243,001 | 9/1993 | Winter et al. | 526/127 |

FOREIGN PATENT DOCUMENTS

| | | |
|---|---|---|
| 616246 | 9/1989 | Australia . |
| 2010065 | 8/1990 | Canada . |
| 2032771 | 6/1991 | Canada . |
| 2055219 | 5/1992 | Canada . |
| 2055216 | 5/1992 | Canada . |

*Primary Examiner*—Vasu S. Jagannathan
*Attorney, Agent, or Firm*—John M. Genova

[57] ABSTRACT

A polyolefin molding composition essentially comprising a polyolefin derived from an olefin having at least 3 carbon atoms, of the formula $R^a$—CH=CH—$R^b$, in which $R^a$ and $R^b$ are identical or different and are hydrogen or $C_1$-$C_{15}$-alkyl, straight-chain or branched, or $R^a$ and $R^b$, together with the atoms connecting them, form a ring, where the polyolefin molding composition may contain up to 10% by weight of ethylene or a second olefin as defined above as comonomer, having a molecular weight $M_w$ of >80,000 g/mol, a polydispersity $M_w/M_n$ of from 1.8 to 3.5, a viscosity of >70 cm$^3$/g, a melting point of from 130° to 160° C., an aligned transparency of >30% and an ether-extractable content of less than 2% by weight.

4 Claims, No Drawings

POLYOLEFIN MOLDING COMPOSITION FOR THE PRODUCTION OF MOLDING OF HIGH RIGIDITY AND TRANSPARENCY BY INJECTION MOLDING

This is a continuation of application(s) Ser. No. 08/481,571, filed on Jun. 7, 1995, which is a continuation of Ser. No. 08/120,117 filed on Sep. 10, 1993, both now abandoned.

The invention relates to a very hard, transparent and rigid polyolefin molding composition for injection-molding applications.

The preparation of polyolefins of high transparency is known. For this purpose, so-called random copolymers are prepared, which are significantly more transparent than homopolymers. However, they have the negative property of a significant reduction in the melting point, hardness, rigidity and scratch resistance compared with the homopolymers (EP-A-0 433 987 and EP-A-0 384 263).

For a large number of injection-molding applications, a reduction in these properties is intolerable. This applies in particular to thin-wall injection molding; for moldings produced in this way, for example drinking cups, high rigidity is a very important criterion and crucial for the selection of the raw material.

For such requirements, use is made of a polyolefin, for example a polypropylene, which is chemically coated with a peroxide in an additional process step after the polymerization.

These molding compositions, known as CR polymers (CR=controlled rheology), have two serious disadvantages:

1) the additional peroxide process step makes the products more expensive, and 2) the reaction with peroxide causes the formation of low-molecular-weight fragments which have an unpleasant odor which is passed on to the molding produced from the polymer. Especially in the case of, for example drinking cups or foodstuff packaging, this odor is undesired.

In addition, the peroxide process can also cause yellowing of the polymer and be responsible for undesired fogging.

The object of the present invention was thus to provide an injection-molding composition which does not have the disadvantageous properties known from the prior art, i.e. a molding composition which has high transparency and rigidity and in addition is odorless and does not yellow.

It has been found that certain polyolefin molding compositions, which can preferably be prepared by polymerization by means of metallocene catalysts, meet said requirements without further conditioning steps, for example a peroxide process step.

In addition, it has been found, surprisingly, that these polyolefin molding compositions, in direct comparison with the CR polymers, enable significantly shorter cycle times to be achieved in the injection-molding machine, i.e. can, as a further advantage, increase the throughput in the machine.

In addition, the higher rigidity than the CR polymers makes it possible to reduce the wall thicknesses of the moldings, which means a saving of raw material.

The present invention thus relates to a polyolefin molding composition essentially comprising a polyolefin derived from an olefin having at least 3 carbon atoms, of the formula $R^a$—CH=CH—$R^b$, in which $R^a$ and $R^b$ are identical or different and are hydrogen or $C_1$-$C_{15}$-alkyl (straight-chain or branched), or $R^a$ and $R^b$, together with the atoms connecting them, form a ring. The polyolefin molding composition may contain up to 10% by weight of ethylene or a second olefin as defined above as comonomer.

The polyolefin molding composition has a molecular weight $M_w$>80,000 g/mol, preferably >100,000 g/mol, a polydispersity $M_w/M_n$ of from 1.8 to 3.5, preferably from 2.0 to 3.0, a viscosity index of >70 cm³/g, preferably >100 cm³/g, a melting point of from 130° to 160° C., preferably from 140° to 160° C., an isotactic block length $n_{iso}$ of from 30 to 100, an aligned transparency of >30%, preferably >35%, and an ether-extractable content of less than 2% by weight, preferably less than 1% by weight.

The polyolefin molding composition according to the invention can be prepared, for example, as described in DE-P 40 35 886.0 (=European Application 0 485 822 A2). It essentially comprises isotactic high-molecular-weight polyolefins, of which polypropylene should be particularly mentioned.

In addition to the polyolefin, the molding composition according to the invention may also contain conventional additives, for example nucleating agents, stabilizers, antioxidants, UV absorbers, light stabilizers, metal deactivators, free-radical scavengers, fillers and reinforcing agents, compatibilizers, plasticizers, lubricants, emulsifiers, pigments, optical brighteners, flameproofing agents, antistatics and blowing agents. In particular, use of nucleating agents is preferred. These cause a significant further improvement in both the rigidity and the transparency. Suitable nucleating agents which are known to persons skilled in the art are available on a large scale and are, for example, finely ground talc, sodium benzoate or sorbitol derivatives, for example benzylidenesorbitol compounds or dibenzylidene-sorbitol compounds.

The molding composition according to the invention is distinguished by high transparency together with high rigidity. In general, these molding compositions can be used in the form of injection moldings in all applications where high transparency and rigidity are required. The molding compositions are also distinguished by the lack of odor and the absence of a yellow coloration.

A particularly preferred area of application of the molding composition according to the invention is in thin-wall injection molding.

The examples below serve to illustrate the invention in greater detail:

| | |
|---|---|
| $M_w$ = | weight average molecular weight (g/mol), determined by gel permeation chromatography |
| $M_w/M_n$ = | polydispersity, determined by gel permeation chromatography |
| II = | isotactic index ($^{13}$C-NMR spectroscopy) |
| $n_{iso}$ = | mean isotactic block length ($^{13}$C-NMR spectroscopy) |
| $n_{PE}$ = | mean polyethylene block length ($^{13}$C-NMR spectroscopy) |
| VI = | viscosity index, measured at 135° C., as a |

| | |
|---|---|
| MFI(230/ = 2.16) | 0.1% strength solution in decahydro-naphthalene in a capillary viscometer melt flow index at 230° C. and a load of 2.16 kg (DIN 53735) |
| Melting point determination by DSC (20° C./min) | |
| Transparency = | 80 mm × 80 mm × 1 mm injection-molded sheets, measurement of the amount of light in the visible region allowed through ($T_{al}$, aligned transparency, referred to as transparency below) |
| BIH = | ball impression hardness (in accordance with DIN 53456, 4 mm moldings, tensile type A in accordance with ISO 3167, injection temperature 240° C.) |
| modulus of elasticity in tension = | secant value, in accordance with DIN 53497-Z |
| Izod impact strength = | in accordance with 180/1C (measured at 20° C.) |
| Standard yellowness (SY) = | in accordance with ASTM D 1925–77, DIN 6167 (test specimens: injection-molded sheets measuring 80 × 80 × 2.0 mm) |
| Density = | density determination at 23° C. in accordance with DIN 53479, method A |
| Elevated-temperature ball impression test | in accordance with IEC 335/1, section 30.1 |
| Heat deflection temperature (Vicat A) | in accordance with ISO 306-1987 or DIN 53460 |

The standard test specimens (moldings) required for the measurements are produced on a Kraus Maffei KM 90/210 B injection-molding machine. The material temperature was 250°±2° C. The flow front speed was 300±20 mm/s, and the mold temperature was 30°±3° C. The plastification cylinder data were a screw diameter of 30 mm, a screw speed of 420 rpm, an injection pressure of 2222 bar and a calculated shot volume of 95 cm$^3$ at a screw of 135 mm.

A POLYMERIZATION

The metallocene catalysts were prepared as described, for example, in DE-P 40 35 883.6 (=European Application No. 0 485 823 A1). The polymerizations were carried out analogously with, for example, DE-P 40 35 886.0 (=European Application No. 0 485 822 A2), but are only intended to have an illustrative character. The molding composition according to the invention can, so long as it satisfies the definition of its properties, be prepared using any suitable catalyst system and any suitable polymerization process.

EXAMPLE 1

A dry 150 dm$^3$ reactor was flushed with propylene and charged at 20° C. with 80 dm$^3$ of a benzine cut having the boiling range 100°–120° C. After 50 l of liquid propylene had been added, 64 cm$^3$ of a methyluminoxane solution (solution in toluene, corresponding to 100 mmol of Al) were added. The reactor contents were warmed to 40° C., and hydrogen was added until a content of 1.2% by volume had been reached in the gas space of the reactor. 19.8 mg of rac-dimethylsilylbis(2-methyl-1-indenyl)zirconium dichloride were dissolved in 32 mol of a toluene solution of methylaluminoxane (corresponding to 50 mmol of Al) and introduced into the reactor. The mixture was polymerized at 40° C. for 18 hours while maintaining the hydrogen content in the reactor constant at 1.2±0.2% by volume. The polymerization was terminated by means of $CO_2$ gas, and the polymer suspension was discharged into a downstream reactor. The suspension medium was separated from the polymer powder via a filter cartridge and by steam distillation, and the aqueous polymer suspension was separated from the water via a pressure filter. The powder was dried for 24 hours at 80° C./100 mbar. Yield: 19.6 kg.

The following data were measured on the powder:
MFI (230/2.16)=32 g/10 min; VI=142 cm$^3$/g;
$M_w$=170,500 g/mol, $M_w/M_n$=2.2;
Melting point 151° C., II=97.2%, $n_{iso}$=59.

EXAMPLE 2

Example 1 was repeated, but a hydrogen concentration of 1.8±0.2% by volume was used, the amount of metallocene was 17.3 mg. 17.9 kg of powder were obtained.

The following data were measured on the powder:
MFI (230/2.16)=58 g/10 min; VI=114 cm$^3$/g;
$M_w$=126,000 g/mol, $M_w/M_n$=2.1;
Melting point 150° C., II=96.8%, $n_{iso}$=53.

EXAMPLE 3

Example 2 was repeated, but 250 g ethylene were metered in at a uniform rate distributed over the entire polymerization time of 15 hours. 18.5 kg of powder were obtained.

The following data were measured on the powder: Ethylene content 1.25% by weight, $n_{PE}$<1.2 (i.e. the majority of the ethylene was incorporated as isolated units).
MFI (230/2.16)=49 g/10 min; VI=131 cm$^3$/g;
$M_w$=139,000 g/mol, $M_w/M_n$=2.4;
Melting point 148° C.

EXAMPLE 4

Example 2 was repeated, but 9.8 mg of the metallocene rac-dimethylsilylbis(2-methyl-4-phenyl-1-indenyl)ZrCl$_2$ were used, the polymerization temperature was 50° C., and the amount of hydrogen used was 2.95±0.5% by volume. 17.0 kg of polymer powder were obtained.

The following data were measured on the powder:
MFI (230/2.16)=30 g/10 min; VZ=147 cm$^3$/g;
$M_w$=189,500 g/mol, $M_w/M_n$=2.0;
Melting point 159° C.

EXAMPLE 5

Example 3 was repeated, but 750 g of ethylene were metered in at a uniform rate distributed over the entire polymerization time. 19.5 kg of polymer powder were obtained.

The following data were measured on the powder: Ethylene content 3.2% by weight, $n_{PE}$<1.2 (i.e. the majority of the ethylene was incorporated as isolated units in the polypropylene chain).
MFI (230/2.16)=32 g/10 min; VI=156 cm$^3$/g;
$M_w$=194,000 g/mol, $M_w/M_n$=2.2;
Melting point 147° C.

EXAMPLE 6

Example 4 was repeated, but the amount of hydrogen used was 2.3±0.3% by volume. 16.9 kg of polymer powder were obtained.

The following data were measured on the powder:
MFI (230/2.16)=19 g/10 min; VI=169 cm$^3$/g;
$M_w$=214,500 g/mol, $M_w/M_n$=2.0;
Melting point 160° C.

EXAMPLE 7

A dry 24 dm$^3$ reactor was flushed with nitrogen and charged with 12 dm$^3$ of liquid propylene.

35 cm$^3$ of the toluene solution of methylaluminoxane (corresponding to 52 mmol of Al, mean degree of oligomerization n=20) were then added, and the batch was stirred at 30° C. for 15 minutes.

In parallel, 4.0 mg of rac-dimethylsilylbis(2-methyl-1-indenyl)zirconium dichloride were dissolved in 13.5 cm$^3$ of a toluene solution of methylaluminoxane (20 mmol of Al) and preactivated by standing for 15 minutes.

The solution was then introduced into the reactor and heated to 78° C. by supply of heat, and the polymerization system was kept at 78° C. for 1 hour by cooling. The polymerization was terminated by removing the excess monomers as gases. The powder was dried at 80° C./200 mbar for 24 hours. The metallocene activity was 454 kg of PP/g of metallocene×h.

VI=146 cm$^3$/g; $M_w$=142,000 g/mol, $M_w/M_n$=2.3;
MFI (230/2.16)=36 g/10 min;
Melting point=140° C., $n_{iso}$=30.

EXAMPLE 8

A dry 150 dm$^3$ reactor was flushed with propylene and charged at 20° C. with 80 dm$^3$ of a benzine cut having the boiling range of 100°–120° C. After 50 l of liquid propylene have been added, 64 cm$^3$ of methylaluminoxane solution (solution in toluene, corresponding to 100 mmol of Al) were added. The reactor contents were warmed to 40° C., and hydrogen was metered in until a content of 0.7% by volume had been achieved in the gas space of the reactor. 11.0 mg (0.02 mmol) of rac-dimethylsilylbis(2-methyl-1-indenyl)zirconium dichloride were dissolved in 32 mol of a toluene solution of methylaluminoxane (corresponding to 50 mmol of Al) and introduced into the reactor. The mixture was polymerized at 40° C. for 24 hours while maintaining the hydrogen content in the reactor constant at 0.73±0.1% by volume. The polymerization was terminated by means of $CO_2$ gas, and the polymer suspension was discharged into a downstream reactor. The suspension medium was separated from the polymer powder via a filter cartridge and by steam distillation, and the aqueous polymer suspension was separated from the water via a pressure filter. The powder was dried for 24 hours at 80° C./100 mbar. Yield: 14.5 kg.

The following data were measured on the powder:
MFI (230/5)=4.8 g/10 min; VI=294 cm$^3$/g;
$M_w$=352,000 g/mol, $M_w/M_n$=2.3;
Melting point 151° C., II=97.0%, $n_{iso}$=65.

EXAMPLE 9

Example 8 was repeated, but no hydrogen was used, the amount of metallocene was 21.5 mg (0.04 mmol), and the polymerization was carried out at 30° C. 15.3 kg of powder were obtained.

The following data were measured on the powder:
MFI (230/5)=3 g/10 min; VI=328 cm$^3$/g;
$M_w$=435,000 g/mol, $M_w/M_n$=2.2;
Melting point 155° C., II=97.4%, $n_{iso}$=78.

EXAMPLE 10

A polypropylene powder having the following properties was prepared at 20° C. analogously to Example 8 (yield 10.1 kg):
MFI (230/5)=2.0 g/10 min; VI=385 cm$^3$/g;
$M_w$=485,000 g/mol, $M_w/M_n$=2.3;
Melting point 157° C., II=97.3%, $n_{iso}$=70.

EXAMPLES 11–13

Polymer powders were prepared as in Example 8, but the amount of hydrogen was varied:

0.4±0.05% by volume of $H_2$ (Example 11), 0.9±0.1% by volume of $H_2$ (Example 12) and 1.5±0.3% by volume of $H_2$ (Example 13).

The powder yields were: 18.7 kg (Example 11), 16.9 kg (Example 12) and 20.6 kg (Example 13).

The results of measurements on these powders are summarized in Table 1.

TABLE 1

|  | Example 11 | Example 12 | Example 13 |
| --- | --- | --- | --- |
| MFI (230/5) [g/10 min] | 18.5 | 32.0 | 109 |
| VI [cm$^3$/g] | 230 | 189 | 135 |
| $M_w$ [g/mol] | 221,000 | 200,000 | 141,000 |
| $M_w/M_n$ | 2.0 | 2.0 | 2.0 |
| Melting point [°C.] | 152 | 152 | 152 |
| II [%] | 96.5 | 96.4 | 96.4 |
| $n_{iso}$ | 50 | 54 | 47 |

EXAMPLES 14 and 15

The polymerization of Example 8 was repeated with the following modifications: The metallocene employed was rac-Me$_2$Si(indenyl)$_2$HfCl$_2$ (cf. EP-A-0 336 127). The polymerizations were carried out at 60° C. using 0.4% by volume of hydrogen (Example 14) and at 50° C. using 0.15% by volume of hydrogen (Example 15). The data shown in Table 2 were measured on the powders:

TABLE 2

|  | Example 14 | Example 15 |
| --- | --- | --- |
| MFI (230/5) [g/10 min] | 90 | 6 |
| VI [cm$^3$/g] | 141 | 250 |
| M$_w$ [g/mol] | 152,000 | 304,000 |
| M$_w$/M$_n$ | 2.1 | 2.2 |
| Melting point [°C.] | 137 | 140 |
| II [%] | 94.5 | 94.6 |
| n$_{iso}$ | 34 | 34 |

EXAMPLE 16

A dry 24 dm$^3$ reactor was flushed with nitrogen and charged with 12 dm$^3$ of liquid propylene.

35 cm$^3$ of a toluene solution of methylaluminoxane (corresponding to 52 mmol of Al, mean degree of oligomerization n=17) were then added, and the batch was stirred at 30° C. for 15 minutes.

In parallel, 2.4 mg (0.005 mmol) of rac-dimethylsilylbis-(2-methyl-1-indenyl)zirconium dichloride were dissolved in 13.5 cm$^3$ of a toluene solution of methylaluminoxane (20 mmol of Al) and preactivated by standing for 15 minutes.

The solution was then introduced into the reactor and heated to 50° C. by supply of heat, and the polymerization system was kept at 50° C. for 3 hours by cooling. The polymerization was terminated by removing the excess monomers as gases. The powder was dried at 80° C./200 mbar for 24 hours. The metallocene activity was 89 kg of PP/g of metallocene×h.

VI=259 cm$^3$/g; M$_w$=342,500 g/mol, M$_w$/M$_n$=2.1;

II=96.8%; MFI (230/5)=8.1 g/10 min;

Melting point=150° C.

EXAMPLE 17

Example 16 was repeated using 11.0 mg (0.02 mmol) of the metallocene rac-phenyl(methyl)silylbis(2-methyl-1-indenyl)zirconium dichloride. The powder, obtained at a metallocene activity of 95.5 kg of PP/g of metallocene×h, had the following properties:

VI=347 cm$^3$g; M$_w$=444,000 g/mol, M$_w$/M$_n$=2.5;

MFI (230/5)=5.2 g/10 min; melting point=149° C.;

II=96.0%.

B NOVEL MOLDING COMPOSITIONS AND MOLDINGS (Use examples)

EXAMPLE 18

The polymer powder from Example 1 was used and was mixed with 0.07% by weight of pentaerithrityl tetrakis[3-(3,5-di-t-butyl-4-hydroxyphenyl)propionate], 0.07% by weight of tris(2,4-di-t-butylphenyl) phosphite, 0.1% by weight of a mixture of 90% of glycerol monostearate and 10% of glycerol distearate (GMS, Atmer 129) and 0.25% by weight of methyldibenzylidenesorbitol (MDBS, Millad 3940) as additives for improving the oxidation resistance, the sliding properties and the demoldability and as nucleating agent, and was granulated using a Werner und Pfleiderer ZSK 28 twin-screw extruder. The temperatures in the five heating zones of the extruder were 150° C. (feed), 210° C., 260° C., 280° C. and 260° C. (die plate). The material temperature was 260° C., and the extruder screws were operated at 280 rpm. Colorless, water-clear granules were obtained. In order to measure the mechanical and optical data, standard moldings were produced by injection molding.

The following characteristic data were determined on these moldings:

MFI (230/2.16)=35 g/10 min; transparency 65%; BIH (358 N)=75 N/mm$^2$; modulus of elasticity in tension (secant) 1610 N/mm$^2$, Izod impact strength 58 mJ/mm$^2$; SY=5.5. The processing properties of the molding composition were tested by thin-wall injection molding (cup injection molding) by injection-molding 175 ml cups having a wall thickness of 0.5 mm on a Netstal 110/45 injection-molding machine. The criteria were the demolding behavior and the achievable cycle time without faults during a run of 3 hours at maximum speed. The processing temperature was 230° C., and the cycle achievable without faults was 32 shots/min (cycle time 1.9 sec). The cups produced were clear, transparent and odorless.

EXAMPLE 19

The procedure was as in Example 18, but the 0.25% by weight of methyldibenzylidenesorbitol were replaced by 0.3% by weight of ultrafine talc as nucleating agent.

The following data were determined on the moldings:

Density=0.904 g/cm$^3$; MFI (230/2.16)=33 g/10 min; transparency 41%; BIH (358 N)=71 N/mm$^2$; modulus of elasticity in tension (secant) 1430 N/mm$^2$; Izod impact strength 52 mJ/mm$^2$; SY=6.5.

The cup injection-molding trial as in Example 18 gave a cycle time of 2.1 seconds.

EXAMPLE 20

The procedure was as in Example 18, but no glycerol stearate or sorbitol were used.

The following data were determined on the moldings:

Density=0.901 g/cm$^3$; MFI (230/2.16)=33 g/10 min; transparency 35%; BIH (358 N)=69 N/mm$^2$; modulus of elasticity in tension (secant) 1430 N/mm$^2$; Izod impact strength 68 mJ/mm$^2$; SY=6.5.

The cup injection-molding trial as in Example 18 gave a cycle time of 2.3 seconds.

COMPARATIVE EXAMPLE 1

Example 18 was repeated using a polypropylene for injection-molding applications (Hostalen PPV 1770 S3A) which had been prepared using a conventional Ziegler-Natta catalyst (TiCl$_4$/MgCl$_2$/diethyl phthalate). The polymer had an ether-extractable content of 4.2% of atactic polypropylene. The isotactic block length of the residue was 150, M$_w$/M$_n$=3.6, and the melting point was 164° C. The following data were measured on moldings produced from this polymer:

Density=0.902 g/cm$^3$; MFI (230/2.16)=27 g/10 min; transparency 23%; BIH (358 N)=64 N/mm$^2$; modulus of elasticity in tension (secant) 1200 N/mm$^2$; Izod impact strength 65 mJ/mm$^2$; SY=8.5.

The cup injection-molding trial as in Example 18 gave a cycle time of 2.5 seconds.

Compared with the moldings from Examples 1 to 3 produced from the novel molding composition, the moldings of the comparative example exhibited significantly lower rigidity (BIH, modulus of elasticity in tension) lower transparency and a greater yellow coloration (SY value).

On conversion into cups, the cycle time was longer, and the cups produced were significantly less transparent and had the typical odor of CR products.

EXAMPLE 21

Example 18 was repeated using the polymer from Example 2.

The following data were measured on the moldings:

MFI (230/2.16)=53 g/10 min; transparency 65%; BIH (358 N)=65 N/mm$^2$; modulus of elasticity in tension (secant) 1600 N/mm$^2$; Izod impact strength 40 mJ/mm$^2$; SY=5.2.

The cup injection-molding trial analogous to Example 18, but with a processing temperature of 220° C., gave a cycle time of 1.7 seconds. The cups produced were transparent, water-clear and odorless.

EXAMPLE 22

Example 19 was repeated, but the polymer used was the polypropylene described in Example 2.

The following data were measured on the moldings:

MFI (230/2.16)=56 g/10 min; density=0.906 g/cm$^3$; transparency 40%; BIH (358 N)=75 N/mm$^2$; modulus of elasticity in tension (secant) 1550 N/mm$^2$; Izod impact strength 46 mJ/mm$^2$; SY=5.3.

The cup injection-molding trial analogous to Example 18, but at a processing temperature of 220° C., gave a cycle time of 1.6 seconds.

COMPARATIVE EXAMPLE 2

Example 22 was repeated using a polypropylene for injection-molding applications (Hostalen PPW 1780 S2A) which had been prepared using a conventional Ziegler-Natta catalyst (TiCl$_4$/MgCl$_2$/diethyl phthalate).

The following data were measured on this polymer:

3.7% by weight of atactic polypropylene (ether extraction); MFI (230/2.16)=54 g/10 min; VI=140 cm$^3$/g; M$_w$=161,000 g/mol, M$_w$/M$_n$=3.8; melting point 162° C.

The following data were measured on moldings produced from this non-novel molding composition:

Density=0.907 g/cm$^3$; MFI (230/2.16)=51 g/10 min; transparency 30%; BIH (358 N)=75 N/mm$^2$; modulus of elasticity in tension (secant) 1400 N/mm$^2$; Izod impact strength 45 mJ/mm$^2$; SY=8.0.

The cup injection-molding trial analogous to Example 22 gave a longer cycle time of 2.0 seconds, and the cups produced were significantly less transparent and had the typical odor of CR products.

EXAMPLE 23

Example 18 was repeated, but the polymer from Example 3 was used. The following data were measured on the moldings:

MFI (230/2.16)=48 g/10 min; transparency 70%; BIH (358 N)=72 N/mm$^2$; modulus of elasticity in tension (secant) 1500 N/mm$^2$; Izod impact strength 95 mJ/mm$^2$; SY=6.0.

The cup injection-molding trial analogous to Example 18 gave a cycle time of 1.7 seconds, and the cups produced had excellent transparency and were odorless.

EXAMPLE 24

Example 18 was repeated, but the polymer from Example 4 was used. The following data were measured on the moldings:

Density=0.908 g/cm$^3$; MFI (230/2.16)=32 9/10 min; transparency 42%; BIH (358 N)=84 N/mm$^2$; modulus of elasticity in tension (secant) 1700 N/mm$^2$; SY=5.8.

The cup injection-molding trial gave a cycle time of 1.4 seconds.

EXAMPLE 25

Example 18 was repeated, but the polymer from Example 5 was used. The following data were measured on the moldings:

MFI (230/2.16)=35 g/10 min; transparency 80%; BIH (358 N)=68 N/mm$^2$; modulus of elasticity in tension (secant) 1550 N/mm$^2$; Izod impact strength: no fracture; SY=6.0.

The cup injection-molding trial gave a cycle time of 1.7 seconds.

EXAMPLE 26

Example 18 was repeated, but the polymer from Example 6 was used. The following data were measured on the moldings:

MFI (230/2.16)=18 g/10 min; transparency 50%; density 0.907 g/cm$^3$; BIH (358 N)=80 N/mm$^2$; modulus of elasticity in tension (secant) 1650 N/mm$^2$; SY=5.5.

The cup injection-molding trial gave a cycle time of 1.4 seconds.

EXAMPLE 27

Example 18 was repeated, but the polymer of Example 5 was used. The following data were measured on the moldings:

MFI (230/2.16)=35 g/10 min; transparency 70%; BIH (358 N)=66 N/mm$^2$; modulus of elasticity in tension (secant) 1350 N/mm$^2$; Izod impact strength 85 mJ/mm$^2$; SY=6.0.

The cup injection-molding trial gave odorless cups of excellent transparency.

EXAMPLE 28

The polymer powder from Example 8 was used. In order to measure the mechanical and optical data, standard moldings (injection moldings, also 4-mm pressed sheets for the measurement of the BIH) were produced. For this purpose, the polymer powder was intimately mixed with 0.3% by weight of pentaerithrityl tetrakis[3-(3,5-di-t-butyl-4-hydroxyphenyl)propionate] and 0.05% by weight of calcium stearate and melted, homogenized and granulated in a Werner und Pfleiderer ZSK 28 twin extruder. The temperatures in the five heating zones of the extruder were 150° C. (feed), 200° C., 270° C., 280° C. and 255° C. (die plate). The material temperature was 255° C., and the extruder screws were operated at 300 rpm. Colorless granules were obtained.

The following data were measured on the moldings produced from this molding composition or on this molding composition itself:

MFI (230/5)=5.2 g/10 min; VI=283 cm$^3$/g;

$M_w$=346,000 g/mol, $M_w/M_n$=2.2;

Melting point=152° C., II=97.0%; $n_{iso}$=65.

Transparency: 48%; Vicat A=147° C.;

Elevated-temperature ball impression test 1.5 mm at 110° C.;

Modulus of elasticity in tension=1376 N/mm$^2$; BIH=74 N/mm$^2$;

BIH on injection moldings in accordance with DIN 53456, 358 N: 76 N/mm$^2$.

COMPARATIVE EXAMPLE 3

The same measurements were carried out on moldings produced from non-novel molding compositions (random copolymer Hostalen PPU 5736 S 2G from Hoechst A G, Frankfurt, Germany (ethylene-propylene copolymer) having an ethylene content of 2.3%).

MFI (230/5)=56 g/10 min; VI=183 cm$^3$/g;

$M_w$=251,000 g/mol, $M_w/M_n$=3.8; melting point=157° C.

The transparency was 50%, the Vicar A value was 140° C.

Modulus of elasticity in tension=1100 N/mm$^2$, ball impression hardness BIH=60 N/mm$^2$.

The comparative example shows that a molding produced from a random copolymer has, for the same transparency, significantly lower heat distortion resistance and reduced hardness and rigidity than the novel molding from Example 28.

EXAMPLE 29

The polymer powder from Example 9 was used. To prepare the molding composition analogously to Example 28, the temperatures in the extruder were 150° C. (feed), 200° C., 250° C., 250° C. and 255° C. (die plate), the material temperature and the extruder screws were operated at 200 rpm. Colorless granules were obtained.

Test results:

MFI (230/5)=2.6 g/10 min; VI=340 cm$^3$/g;

$M_w$=448,000 g/mol, $M_w/M_n$=2.2;

Melting point=156° C.; II=96.8%, $n_{iso}$=65.

Transparency: 54%; Vicat A=151° C.;

Elevated-temperature ball impression test 1.5 mm at 115° C.;

Modulus of elasticity in tension=1509 N/mm$^2$; BIH=79 N/mm$^2$.

COMPARATIVE EXAMPLE 4

A commercially available polypropylene (Hostalen PPN 1060 from Hoechst A G, Frankfurt, Germany) molding composition was investigated in the same way:

MFI (230/5)=8 g/10 min; VI=290 cm$^3$/g; $n_{iso}$=109;

$M_w$=280,000 g/mol, $M_w/M_n$=6.0; melting point=164° C.

Mechanical or optical data of the molding produced from Hostalen PPN 1060:

Transparency: 24%; Vicat A=152° C.;

Modulus of elasticity in tension=1300 N/mm$^2$; BIH=80 N/mm$^2$.

The comparative experiment shows that, for otherwise comparable mechanical data and for comparable heat of distortion resistance, the transparency of the novel moldings from Example 29 is not achieved by far.

EXAMPLE 30

The polypropylene powder from Example 10 was used, the molding composition was prepared analogously to Example 28, the temperatures in the extruder were 135° C. (feed), 175° C., 290° C., 280° C. and 250° C. (die plate), the material temperature was 280° C., and the extruder screws were operated at 300 rpm.

MFI (230/5)=1.8 g/10 min; VI=385 cm$^3$/g;

$M_w$=471,000 g/mol, $M_w/M_n$=2.7;

Melting point=156° C.; II=97.4%, $n_{iso}$=70;

Transparency=56%; Vicat A=152° C.;

Elevated-temperature ball impression test 1.7 mm at 100° C.;

Modulus of elasticity in tension=1561 N/mm$^2$; BIH=79 N/mm$^2$.

The moldings produced from the molding composition combine high transparency with high heat distortion resistance, hardness and rigidity.

EXAMPLES 31–33

The polypropylene powders from Examples 11 (Example 31), 12 (Example 32) and 13 (Example 33) were used. The novel moldings were produced from the polymer powders by extrusion (analogously to Example 28).

The extruder was operated in the following way:

| | | Temperatures [°C.] | | | | |
|---|---|---|---|---|---|---|
| | rpm of the screws | Zone 1 (Feed) | Zone 2 | Zone 3 | Zone 4 | Zone 5 (Die plate) | Material |
| Ex. 31 | 300 | 150 | 185 | 250 | 250 | 230 | 240 |
| Ex. 32 | 300 | 130 | 155 | 200 | 175 | 175 | 185 |
| Ex. 33 | 300 | 110 | 145 | 185 | 175 | 160 | 180 |

The measurement results on the granules and moldings are shown in Table 3.

TABLE 3

| | Example 31 | Example 32 | Example 33 |
|---|---|---|---|
| MFI (230/5) [g/10 min] | 17.2 | 36.7 | 114 |
| VI [cm$^3$/g] | 213 | 179 | 125 |
| $M_w$ [g/mol] | 235,500 | 194,500 | 135,000 |
| $M_w/M_n$ | 2.0 | 2.0 | 1.9 |
| Melting point [°C.] | 152 | 152 | 151 |
| II [%] | 96.5 | 96.5 | 96.3 |
| $n_{iso}$ | 49 | 52 | 45 |
| Transparency [%] | 55 | 46 | 53 |
| Vicat A [°C.] | 147 | 145 | 142 |
| Elevated-temperature ball impression test [mm at 110° C.] | 1.5 | 1.6 | 1.6 |
| Modulus of elasticity in tension [N/mm$^2$] | 1370 | 1400 | 1400 |
| BIH [N/mm$^2$] | 77 | 80 | 82 |

EXAMPLES 34 AND 35

The polymer powders of Examples 14 (Example 34) and 15 (Example 35) were used. The moldings were produced by extrusion analogously to Example 28. The extruder was operated in the following way:

| | Temperatures [°C] | | | | | |
|---|---|---|---|---|---|---|
| | rpm of the screws | Zone 1 (Feed) | Zone 2 | Zone 3 | Zone 4 | Zone 5 (Die plate) | Material |
| Ex. 34 | 300 | 130 | 165 | 190 | 180 | 155 | 190 |
| Ex. 35 | 165 | 150 | 210 | 250 | 250 | 240 | 240 |

The measurement results on the granules and moldings are shown in Table 4.

TABLE 4

| | Example 34 | Example 35 |
|---|---|---|
| MFI (230/5) [g/10 min] | 93 | 5.8 |
| VI [cm$^3$/g] | 132 | 255 |
| M$_w$ [g/mol] | 146,000 | 315,000 |
| M$_w$/M$_n$ | 2.2 | 2.3 |
| Melting point [°C] | 138 | 139 |
| II [%] | 94.5 | 95.0 |
| n$_{iso}$ | 35 | 39 |
| Transparency [%] | 65 | 64 |
| Vicat A [°C] | 131 | 132 |
| Elevated-temperature ball impression test [mm at 110° C.] | 1.7 | 1.7 |
| Modulus of elasticity in tension [N/mm$^2$] | 1260 | 1200 |
| BIH [N/mm$^2$] | 71 | 68 |

EXAMPLE 36

Moldings were produced analogously to Example 28 by extrusion from the polymer powder of Example 16. The conditions in the extruder were: 150° C. (feed), 200° C., 260° C., 270° C. and 250° C. (die plate), material temperature 260° C., screw speed 300 rpm.

The following data were measured on the molding composition and on the moldings.

MFI (230/5)=6.8 g/10 min; VI=264 cm$^3$/g;

M$_w$=328,000 g/mol, M$_w$/M$_n$=2.1;

Melting point=152° C., II=96.8%, n$_{iso}$=61;

Transparency=44%; elevated-temperature ball impression test 1.5 mm at 110° C.;

Vicar A=145° C.; BIH=74 N/mm$^2$; modulus of elasticity in tension=1422 N/mm$^2$.

EXAMPLE 37

The procedure was as in Example 36, but the polymer powder from Example 17 was used.

MFI (230/5)=4.1 g/10 min; VI=293 cm$^3$/g;

M$_w$=369,000 g/mol, M$_w$/M$_n$=2.0; melting point=151° C.;

II=96.4%, n$_{iso}$=60; transparency=51%;

elevated-temperature ball impression test=1.5 mm at 110° C.;

Vicat A=149° C.; BIH=75 N/mm$^2$;

Modulus of elasticity in tension=1439 N/mm$^2$.

EXAMPLE 38 a) Preparation of the polymer:

A dry 150 dm$^3$ reactor was flushed with nitrogen and propylene and charged at 20° C. with 80 dm$^3$ of a benzine cut having the boiling range from 100°–120° C. from which the aromatic components had been removed. After 50 l of liquid propylene had been added, 64 cm$^3$ of a toluene solution of methylaluminoxane (corresponding to 100 mmol of Al) were added. The reactor contents were warmed to 50° C., and hydrogen was metered in until a content of 2.9% by volume had been reached in the gas space of the reactor. 10.6 mg of rac-dimethylsilylbis(2-methyl-4-phenyl-1-indenyl)-zirconium dichloride were dissolved in 16 ml of a toluene solution of methylaluminoxane (25 mmol of Al) and introduced into the reactor. The mixture was polymerized at 50° C. to a residual pressure of 1 bar of propylene while maintaining the hydrogen content in the gas space of the reactor constant at 2.9±0.1% by volume. The polymerization reaction was terminated by means of CO$_2$ gas, and the polymer suspension was discharged into a downstream reactor. The suspension medium was separated from the polymer powder via a filter cartridge and by steam distillation, and the aqueous polymer suspension was separated from the water via a pressure filter. The powder was dried at 80° C./100 mbar for 24 hours.

Yield 20.8 kg

MFI (230/5)=37 g/10 min; VI=182 cm$^3$/g; M$_w$=197,500 g/mol, M$_w$/M$_n$=2.4; melting point=160° C.; II=98.8%, n$_{iso}$100.

b) Preparation of the molding composition

The molding composition was prepared analogously to Example 28. The temperatures in the extruder were 150° C. (feed), 200° C., 290° C., 280° C. and 260° C. (die plate), the material temperature was 275° C., and the extruder screws were operated at 250 rpm. The following data were measured on the moldings produced from the molding composition:

MFI (230/5)=35 g/10 min; VI=185 cm$^3$/g; M$_w$=200,500 g/mol, M$_w$/M$_n$=2.4; melting point=160° C.; transparency=54%; Vicat A=156° C.; elevated-temperature ball impression test 1.8 mm at 100° C.; modulus of elasticity in tension=1640 N/mm$^2$; BIH=84 N/mm$^2$.

The moldings produced from the molding composition have high transparency, heat distortion resistance, hardness and rigidity.

EXAMPLE 39 a) Preparation of the cocatalyst/metallocene system aa) Preparation of the supported cocatalyst:

The supported cocatalyst was prepared as described as in EP 92 107 331.8 in the following way in a stainless-steel explosion-proofed reactor with a 60 bar pump system, with inert-gas supply, temperature-controlled by jacket cooling and a second cooling jacket via a heat exchanger in the pump system. The pump system sucked in the reactor contents via a connection in the reactor base, forced them into a mixer and fed them back into the reactor through a lifting tube via a heat exchanger. The mixer was connected in such a way that the feed contained a narrowed cross-section, where an increased flow rate was produced and in whose turbulence zone was run axially and counter to the flow direction a thin feed line through which—in cycles—in each case a defined amount of water could be fed in under 40 bar of argon. The reaction was monitored via a sampler in the pump circuit.

5 dm$^3$ of decane were introduced under inert conditions into the above-described reactor with a capacity of 16 dm$^3$. 0.3 dm$^3$ (=3.1 mol) of trimethylaluminum were added at 25° C. 250 g of silica gel SD 3216-30 (Grace A G) which had previously been dried at 120° C. in an argon fluidized bed were then metered into the reactor via a solids funnel and distributed homogeneously with the aid of the stirrer and the pump system. A total amount of 45.9 g of water was introduced into the reactor in the course of 2 hours in portions of 0.1 cm³ every 15 seconds. The pressure caused by the argon and the evolved gases was kept constant at 10 bar by pressure-regulation valves. When all the water had been introduced, the pump system was switched off and the stirring was continued at 25° C. for a further 5 hours. The solvent was removed via a pressure filter, and the cocatalyst solid was washed with decane and then dried in vacuo.

ab) Reaction of the cocatalyst with the metallocene rac-dimethylsilanediylbis(2-methyl-4-phenyl-1-indenyl)ZrCl$_2$ 1.5 g of the solid prepared under aa) (106 mmol of Al) were suspended in 100 cm³ of toluene in a stirrable vessel and cooled to −30° C. At the same time, 155 mg (0.246 mmol) of rac-dimethyl-silanediylbis(2-methyl-4-phenylindenyl)zirconium dichloride were dissolved in 75 cm³ of toluene and added dropwise to the suspension in the course of 30 minutes. The mixture was warmed slowly to room temperature with stirring, during which time the suspension took on a red color. The mixture was subsequently stirred at 80° C. for 1 hour, cooled to room temperature and filtered, and the solid washed 3× with 100 cm³ of toluene in each case and once with 100 cm³ of hexane. The hexane-moist filter residue which remained was dried in vacuo, giving 12.9 g of free-flowing, pale red, supported catalyst. Analysis gave a content of 10.1 mg of zirconocene per gram of catalyst.

b) Polymerization 2.8 g of the catalyst prepared under ab) were suspended in 50 cm³ of a benzine cut having the boiling range from 100°–120° C. from which the aromatic components had been removed.

In parallel, a dry 75 dm³ reactor was flushed first with nitrogen and then with propylene and charged with 7.5 dm³ (s.t.p.) of hydrogen and with 40 dm³ of liquid propylene. 12 cm³ of triisobutylaluminum (48 mmol) were then diluted with 100 ml of hexane, the mixture was introduced into the reactor, and the batch was stirred at 30° C. for 15 minutes. The catalyst suspension was subsequently introduced into the reactor, the mixture was heated to the polymerization temperature of 70° C. (10° C./min), and the polymerization system was kept at 70° C. for 1 hour by cooling. The polymerization was terminated by addition of 50 ml of isopropanol. The excess monomer was removed as a gas, and the polymer was dried in vacuo, giving 5.0 kg of polypropylene powder.

The following data were measured on the powder:

MFI (230/5)=6.1 g/10 min; VI=305 cm³/g; $M_w$=382,000 g/mol, $M_w/M_n$=2.2; melting point=150° C.

c) Preparation of the molding composition

The molding composition was prepared analogously to Example 28. The temperatures in the extruder were 150° C. (feed), 200° C., 250° C., 280° C. and 270° C. (die plate), the material temperature was 270° C., and the screw speed was 240 rpm.

The following data were measured on the molding composition and on the moldings:

MFI (230/5)=6.5 g/10 min; VI=285 cm³g; $M_w$=379,000 g/mol; $M_w/M_n$=2.2; melting point=151° C. Transparency 45%, elevated-temperature ball impression test 1.4 mm at 110° C.; Vicat A=147° C.; BIH=79 N/mm²; modulus of elasticity in tension=1487 N/mm².

We claim:

1. A method of using a molding composition for the production of thin-wall injection moldings, wherein the molding composition comprises a polyolefin derived from an olefin having at least 3 carbon atoms, of the formula $R^a$—CH═CH—$R^b$, in which $R^a$ and $R^b$ are identical or different and are hydrogen or $C_1$-$C_{15}$-alkyl, straight-chain or branched, or $R^a$ and $R^b$, together with the atoms connecting them, from a ring, where the polyolefin molding composition may contain up to 10% by weight of ethylene or a second olefin as defined above as comonomer, having a molecular weight $M_w$ of >80,000 g/mol, a polydispersity $M_w/M_n$ of from 1.8 to 3.5, a viscosity index of >70 cm³/g, a melting point of from 130° to 160° C., an isotactic block length of from 30 to 100, an aligned transparency of >30% and an ether-extractable content of less than 2% by weight.

2. Thin-wall moldings comprising a molding composition comprising a polyolefin derived from an olefin having at least 3 carbon atoms, of the formula $R^a$—CH═CH—$R^b$, in which $R^a$ and $R^b$ are identical or different and are hydrogen or $C_1$-$C_{15}$-alkyl, straight-chain or branched, or $R^a$ and $R^b$, together with the atoms connecting them, from a ring, where the polyolefin molding composition may contain up to 10% by weight of ethylene or a second olefin as defined above as comonomer, having a molecular weight $M_w$ of >80,000 g/mol, a polydispersity $M_w/M_n$ of from 1.8 to 3.5, a viscosity index of >70 cm³/g, a melting point of from 130° to 160° C., an isotactic block length of from 30 to 100, an aligned transparency of >30% and an ether-extractable content of less than 2% by weight.

3. The molding as claimed in claimed 2 wherein injection thin-wall moldings is used to produce the thin-wall moldings.

4. Thin-wall injection moldings comprising a molding composition comprising a polyolefin derived from an olefin having at least 3 carbon atoms, of the formula $R^a$—CH═CH—$R^b$, in which $R^a$ and $R^b$ are identical or different and are hydrogen or $C_1$-$C_{15}$-alkyl, straight-chain or branched, or $R^a$ and $R^b$, together with the atoms connecting them, form a ring, where the polyolefin molding composition may contain up to 10% by weight of ethylene or a second olefin as defined above as comonomer, having a molecular weight $M_w$ of >80,000 g/mol, a polydispersity $M_w/M_n$ of from 1.8 to 3.5, a viscosity index of >70 cm³/g, a melting point of from 130° to 160° C., an isotactic block length of from 30 to 100, an aligned transparency of >30% and an ether-extractable content of less than 2 % by weight.

* * * * *